United States Patent [19]

Herkelmann et al.

[11] Patent Number: 5,356,611
[45] Date of Patent: Oct. 18, 1994

[54] METHOD OF RECOVERING IODINE

[75] Inventors: Ralf Herkelmann; Werner Rudolph, both of Hanover; Dirk Seffer, Neustadt, all of Fed. Rep. of Germany

[73] Assignee: Solvay Fluor und Derivate GmbH, Hanover, Fed. Rep. of Germany

[21] Appl. No.: 144,515

[22] Filed: Nov. 2, 1993

[30] Foreign Application Priority Data

Nov. 19, 1992 [DE] Fed. Rep. of Germany ....... 4238915

[51] Int. Cl.$^5$ ............................................. C01B 7/14
[52] U.S. Cl. ................... 423/501; 423/500; 423/502; 210/670; 210/685
[58] Field of Search ............ 423/501, 500, 502; 210/670, 685

[56] References Cited

U.S. PATENT DOCUMENTS

| | | | |
|---|---|---|---|
| 2,945,746 | 7/1960 | Shaw | 423/501 |
| 3,050,369 | 8/1962 | Mills | 423/501 |
| 3,352,641 | 11/1967 | Nakamura et al. | 423/501 |
| 3,425,798 | 2/1969 | Statman et al. | 423/500 |
| 4,088,737 | 5/1978 | Thomas et al. | 423/240 |
| 4,107,271 | 8/1978 | Atsukawa et al. | 423/235 |
| 4,131,645 | 12/1978 | Keblys et al. | 423/501 |
| 4,451,375 | 5/1984 | Grinstead | 210/670 |
| 4,615,806 | 10/1986 | Hilton | 210/690 |
| 4,650,649 | 3/1987 | Zoeller | 423/22 |
| 4,734,171 | 3/1988 | Murphy | 423/500 |
| 4,976,947 | 12/1990 | Agreda et al. | 423/502 |

FOREIGN PATENT DOCUMENTS

| | | | |
|---|---|---|---|
| 002636 | 6/1979 | European Pat. Off. | |
| 2624358 | 12/1976 | Fed. Rep. of Germany | |
| 27-4464 | 10/1952 | Japan | 423/501 |
| 89/08674 | 9/1989 | PCT Int'l Appl. | |
| 606809 | 5/1978 | U.S.S.R. | 423/501 |
| 1239090 | 6/1986 | U.S.S.R. | 423/501 |
| 1058429 | 2/1967 | United Kingdom | 423/501 |

OTHER PUBLICATIONS

Weetall et al., "Iodine Recovery from Brine Solutions", Inorganica Chemica Acta, 104 (1985) 119–123.
Kirth–Othmer, "Encyclopedia of Chemical Technology", 3rd edition, vol. 13, pp. 649–677, 1978.
Seamster et al., "Ion exchange becomes Powerful Processing Tool" Chemical Engineering, Aug. 22, 1960.

Primary Examiner—Wayne Langel
Assistant Examiner—N. M. Nguyen
Attorney, Agent, or Firm—Evenson, McKeown, Edwards & Lenahan

[57] ABSTRACT

A method for recovering iodine from a composition containing iodine and/or iodide in which any iodine present is first reduced to iodide, the iodide is then separated from solution by selective anion exchange absorption, the separated iodide is eluted from the exchanger, the iodide-containing eluate solution is treated with a cation exchanger, $H_2O_2$ and $H_2SO_4$ are then added to the remaining solution, and the resulting iodine is precipitated and may be separated out in crystalline form. The method is also particularly suitable for separating iodine from solutions which contain organic constituents such as nitrogen-containing organic compounds.

9 Claims, No Drawings

METHOD OF RECOVERING IODINE

BACKGROUND OF THE INVENTION

This invention relates to a method for recovering iodine from a composition containing iodine and/or iodide.

Iodine and iodine-containing compounds or iodides are important catalysts or starting compounds in chemical synthesis. Consequently, compositions containing iodine and/or iodide are produced in chemical synthesis processes, for instance in trifluoromethylation processes using $CF_3I$ as a trifluoromethylating reagent. Compositions which contain iodine and/or iodide are also obtained in the treatment of waste gases and in the incineration of algae. It is desirable to obtain or recover the iodine from such compositions.

It is known to recover iodide from corresponding salt solutions by adding iron sulfate and hydrogen peroxide to oxidize the iodide, and then extracting the resulting iodine chloroform. This method, which is described by H. H. Weetall and W. Hertl in *Inorg. Chim. Acta* 104:119–23 (1985), has the disadvantage that the remaining solution is contaminated with both iron sulfate and chloroform. Furthermore, the extracted iodine must be laboriously separated from the chloroform.

SUMMARY OF THE INVENTION

It is the object of the present invention to provide an improved method for separating iodine from compositions which contain iodine and/or iodide.

Another object of the invention is to provide a method for separating iodine from compositions which contain iodine and/or iodide which yields highly pure iodine.

These and other objects of the invention are achieved by providing a method for recovering iodine from a composition containing iodine, iodide or mixtures of iodine and iodide, comprising the steps of reducing any iodine present to iodide; separating the iodide from an aqueous solution by ion exchange absorption with an iodide-selective anion exchanger; eluting iodide from the anion exchanger by treating the ion exchanger with lye to obtain an iodide-containing eluate solution; treating the iodide-containing eluate solution with a cation exchanger until the solution has a pH of less than 4; oxidizing the iodide in the treated solution with $H_2O_2$ to form iodine, and isolating the resulting iodine.

DETAILED DESCRIPTION OF PREFERRED EMBODIMENTS

The method according to the invention for recovering iodine from a composition containing iodine and/or iodide provides for any iodine present to be reduced to iodide, for the iodide then to be separated from an aqueous solution by means of an anion exchanger which selectively absorbs iodide, for the iodide to be eluted from the anion exchanger by treatment with lye, for the solution containing the eluted iodide to be treated with a cation exchanger until the pH value of the solution is lower than 4, for the iodide to be oxidized from the treated solution with $H_2O_2$ to form iodine, and for the resulting iodine to be isolated.

In order to increase the yield if iodine is contained in the composition, it is preferably recommended to reduce this iodine in advance. To this end, conventional reduction agents, preferably calcium oxide (CaO) and sulfur dioxide ($SO_2$), are used, which are added in a sufficient quantity, preferably the stoichiometrically required quantity.

If the composition to be treated is not yet in the form of an aqueous solution, water is added. Preferably the iodide content of the aqueous solution which is to be treated is adjusted to from 10 to 20% by weight.

Suitable iodide-selective ion exchangers are known in the art. One suitable anion exchanger which may be used to selectively absorb the iodide is commercially available from SERVA under the trade name "Serdolit AWG ™". The absorption of iodide is preferably carried out at a pH value of between 6 and 8.

Then the iodide absorbed on the anion exchanger is eluted by treatment with lye. Aqueous solutions of alkaline substances may be used as lye. Preferably aqueous solutions of alkaline earth metal hydroxides or alkali metal hydroxides are used, particularly the alkali metal hydroxides. Sodium hydroxide solution containing a concentration of from 5 to 10 wt-% NaOH is particularly suitable.

The eluate is then treated with a cation exchanger. In principle, any known cation exchanger may be used. A cation exchanger of the "Lewatit" type, for instance "Lewatit S 100 ™", produced by Bayer of Leverkusen, Germany is particularly well suited. In this case, the pH value is adjusted to between 0 and 4. The solution treated with the cation exchanger is then advantageously adjusted to an iodide content of 10 to 32% by weight, for instance by evaporation. Then mineral acid, preferably sulfuric acid, is added, and the iodide ions are oxidized with hydrogen peroxide. Hydrogen peroxide solutions of conventional concentration may be used for this purpose. Higher concentrations of sulfuric acid or higher concentrations of hydrogen peroxide are recommended. For instance, concentrated sulfuric acid ($H_2SO_4$ content greater than 90% by weight) and concentrated hydrogen peroxide solution ($H_2O_2$ content greater than 40% by weight) may be used. The resulting iodine can then be filtered out, and the only further purification measure which is needed is drying.

In principle, the method of the invention may be used for obtaining or recovering iodine or iodide from any desired compositions. It is particularly well suited for treating compositions containing organic compounds, in particular nitrogen-containing organic compounds.

The following examples are intended to illustrate the invention in further detail without restricting its scope.

EXAMPLE 1

Recovery of Iodine From a Solution Containing Iodine and Iodide

A solution containing iodine, iodide, monomethylformamide, dimethylamidinium sulfate, methylamine and formic acid was treated. The iodide content was about 25% by weight, and the iodine content was about 45% by weight. 200 g of this solution were diluted with 300 g of water, in order to decrease the viscosity. In order to reduce the elemental iodine, 21.9 grams of calcium oxide were added, and 26.6 grams of sulfur dioxide were introduced with thorough stirring. The resulting solid was then filtered out and washed with water. The remaining, dried residue was composed as follows: 19.8% calcium, 49.2% sulfate, 7.4% iodide and 0.1% sulfite.

The filtrate contained 17.3% by weight iodide, and elemental iodine could not be detected. The filtrate was passed over an anion exchanger of the type Serdolit AWG, and iodide could no longer be detected in the eluate. Iodide bound on the anion exchanger was recovered by passing 2 Normal sodium hydroxide solution through the ion exchanger. The eluate contained 0.83% iodide and 0.08% chloride. The eluate was then concentrated on a rotary evaporator, the resulting strongly alkaline salt solution was then treated with a cation exchanger of the type Lewatit S 100 in order to neutralize the alkalinity of the solution. The eluate, which was now acidic, contained 1.08% by weight iodide, less than 10 ppm iodine and 0.1% by weight chloride. The solution was concentrated again on the rotary evaporator until the resulting salt solution contained approximately 32% iodide. After addition of 2.8 g sulfuric acid (96% by weight $H_2SO_4$) and 1.9 g hydrogen peroxide (50% by weight $H_2O_2$), both with ice cooling, elemental iodine was produced. The iodine which crystallized out was filtered out and dried over phosphorus pentoxide. The iodine content was 98.8% (ignition loss: 0.25%).

EXAMPLE 2

Recovery of Iodide From Iodide-Containing Solution

A solution which contained dimethylamidinium iodide, perfluoroalcohols and methyl formamide was treated as described in Example 1, except that the addition of calcium oxide and $SO_2$ was omitted. The further performance of the process and the results corresponded to those of Example 1.

The foregoing description and examples have been set forth merely to illustrate the invention and are not intended to be limiting. Since modifications of the described embodiments incorporating the spirit and substance of the invention may occur to persons skilled in the art, the scope of the invention should be construed to include all variations falling within the ambit of the appended claims and equivalents thereof.

What is claimed is:

1. A method for recovering iodine from an aqueous solution containing iodine, iodide or mixtures of iodine and iodide, said method comprising the steps of:

if iodine is present, reducing the iodine to iodide;

separating the iodide from said aqueous solution by ion exchange absorption with an iodide-selective anion exchanger;

eluting iodide from the anion exchanger by treating the ion exchanger with lye to obtain an iodide-containing eluate solution;

treating the iodide-containing eluate solution with a cation exchanger until the solution has a pH of less than 4;

oxidizing the iodide in the treated solution with $H_2O_2$ to form iodine, and isolating the resulting iodine.

2. A method according to claim 1, wherein said method comprising initially adjusting said aqueous solution to have an iodide content in the range from 10 to 20 wt-%.

3. A method according to claim 1, wherein any iodine present is reduced to iodide by treatment with CaO and $SO_2$.

4. A method according to claim 1, wherein the iodide separating step is effected at a pH value of from 6 to 8 by absorption with an anion exchanger which selectively absorbs iodide.

5. A method according to claim 1, wherein said eluting step is effected by means of a sodium hydroxide solution containing from 5 to 10 wt-% NaOH.

6. A method according to claim 1, wherein the iodide-containing eluate solution is treated with the cation exchanger until the solution has a pH in the range from 0 to 4.

7. A method according to claim 1, wherein after treatment with the cation exchanger, the iodide-containing eluate solution is adjusted to have an iodide content of from 10 to 32 wt-%.

8. A method according to claim 1, wherein said aqueous solution containing iodine to be recovered further comprises at least one organic compound.

9. A method according to claim 8, wherein said aqueous solution containing iodine to be recovered further comprises at least one nitrogen-containing organic compound.

* * * * *